United States Patent [19]

McEwan

[11] Patent Number: 4,693,948
[45] Date of Patent: Sep. 15, 1987

[54] ELECTRIC STORAGE BATTERY

[75] Inventor: Keith J. B. McEwan, Solihull, England

[73] Assignee: Lucas Industries Public Limited Company, Birmingham, England

[21] Appl. No.: 811,438

[22] Filed: Dec. 20, 1985

[30] Foreign Application Priority Data

Dec. 20, 1984 [GB] United Kingdom ................. 8432260

[51] Int. Cl.⁴ .......................... H01M 2/26; H01M 2/00
[52] U.S. Cl. ......................................... 429/121; 429/1; 429/65; 429/123
[58] Field of Search ...................... 429/1, 121, 123, 65

[56] References Cited

U.S. PATENT DOCUMENTS

| | | | |
|---|---|---|---|
| 1,632,535 | 6/1927 | Breeden et al. | 429/1 |
| 1,734,145 | 11/1929 | Piper | 429/121 X |
| 4,291,106 | 9/1981 | Hooke | 429/1 |
| 4,394,059 | 7/1983 | Reynolds | 429/121 X |

FOREIGN PATENT DOCUMENTS

| | | |
|---|---|---|
| 0072123 | 2/1983 | European Pat. Off. . |
| 1356459 | 6/1974 | United Kingdom . |
| 1302267 | 1/1983 | United Kingdom . |

Primary Examiner—Brian E. Hearn
Assistant Examiner—Stephen J. Kalafut
Attorney, Agent, or Firm—Nixon & Vanderhye

[57] ABSTRACT

An electric storage battery has terminals (T1, T2) each having a wall (W1, W2) thereabout shaped to inhibit connection of an incorrect connectors (C1, C2) which are of mutually different shape and/or size. Each terminal (T1, T2) is laterally spaced from the electrode post (P1, P2) of the battery to which it is connected, and each post (P1, P2) is joined by a cast lead linking member (E) to the terminals.

22 Claims, 2 Drawing Figures

ELECTRIC STORAGE BATTERY

FIELD OF THE INVENTION

This invention relates to an electric storage battery, and particularly but not exclusively to an electric storage battery for use in the electrical system of an automobile.

BACKGROUND OF THE INVENTION

A known electric storage battery for use in an automobile comprises a casing in the form of a box of electrically insulating material divided by internal partition walls into a plurality of compartments each containing a cell assembly of plates and separators, and a lid closing the box. Each cell assembly is connected through the bounding partition wall or walls to the or each adjacent cell assembly, and each end cell assembly is connected to a respective electrode post received in a complementary bush mounted in the lid. The bushes in turn are electrically connected to the two electrode posts respectively thereby constituting positive and negative terminals for the battery. Such electric storage batteries are disclosed in GB-A-1500290 and GB-A-1569410.

It has long been known that some electrical equipment as found in automobiles or the like can be damaged if connected to an electrical storage battery with incorrect polarity, that is with a supply load intended for connection to the positive terminal connected to the negative terminal and vice versa, and a number of proposals have been made in an attempt to prevent such misconnection of equipment to the terminals of a battery. One such proposal is disclosed in GB-A-1356459 which discloses an arrangement in which in an attempt to avoid misconnection the terminals of the battery are made of mutually different shapes, each to have connected thereto a connector of an appropriate individual shape. More specifically, in this known arrangement the connector for connection of the negative terminal is a generally planar metal body of generally rectangular shape as seen in plan. For connection the body is stood on edge and abutted against one side of an upstanding wall of the negative terminal, the body and the wall being apertured to receive a bolt to secure the body to the terminal. The connector for connection to the positive terminal is a generally planar metal body of generally cruciform shape, and for connection it is abutted against an upstanding wall of the positive terminal, the wall extending from a base having a recess to receive one short arm of the cruciform shape, the body being secured to the terminal by means of a bolt. Even with such an arrangement it is still possible for an unskilled person to make a wrong connection, or this can happen to even a skilled person when working in awkward conditions such as at night.

SUMMARY OF THE INVENTION

It is one object of the invention to provide an electric storage battery having a negative terminal and a positive terminal provided with means to inhibit the making of incorrect electrical connections, at least to one of the terminals, without taking up more space. This object is achieved according to the invention by providing adjacent to the terminal an insulating wall adapted to ensure that only the intended connector may be connected to the respective terminal.

According to this invention there is provided an electric storage battery comprising a casing having a pair of terminals extending therefrom for connection to respective connectors characterised in that an insulating wall is present about at least one of the terminals, the wall being shaped such that it prevents connection of both connectors to the terminal.

Preferably a wall is present at each terminal and the walls are shaped such that a connector for connection to one of the terminals cannot be connected to the other terminal and a connector for connection to the other terminal cannot be connected to the one terminal.

The insulating wall may take a wide variety of shapes and sizes depending on the shape and size of the connector and the relative position at which the connector will engage the terminal. In one embodiment the wall defines an axial passageway through which only a connector of the correct width can pass to engage the terminal. In another embodiment the wall defines a radial aperture through which only a connector of the appropriate width and height can pass. Where the connector has side extensions, as in one which is cruciform as seen in plan, the aperture will have corresponding extensions to allow the connector to pass through. The side extensions of the connector need not be co-planar to the connector. The connector may only have one extension which need not be at the side.

The insulating wall is preferably formed as by molding of an electrically insulating material e.g., a plastic. The wall may be formed integrally with the battery lid or it may be formed separately and then secured thereto, e.g., by welding. Where the wall is separately engaged, the facing parts may have keying or like deformations to hold the parts securely together.

Each terminal may take a variety of shapes and sizes. In one embodiment the terminal is an externally threaded stud, and a nut is fitted thereon with the connector trapped in between. In another embodiment the terminal is a stud having a tapped hole to receive a threaded bolt.

It is a much preferred feature of the invention that each wall stands higher than the terminal with which it is associated. By virtue of the height and shape of the interior surface of the wall the nut or bolt will not be able to engage the respective stud or tapped hole. Where the stud is threaded, if the threading is disposed at the lower part of the stud, the height of the wall will present another extra obstacle to an attempt to fit the incorrect connector and nut onto the stud.

The terminals may be present on the upper horizontal surface or on a side surface of the battery lid. The terminals may however be fitted into a recess in the lid or may be present on an inclined or upright portion associated with the battery lid. The terminal may also be provided on the vertical wall of the battery box itself.

In a more specific aspect, the invention provides an electric storage battery as defined and comprising a casing formed of an electrically insulated material, the casing having at or near one end of the casing a negative electrode post and at or near the other end of the casing a positive electrode post, a terminal being associated with each post, characterized in that each terminal is spaced from its associated electrode post laterally of the axis of the electrode post and is connected thereto by an electrically conductive linking member.

BRIEF DESCRIPTION OF THE DRAWINGS

This invention will now be described by way of example with reference to the drawing, in which FIGS. 2 and 3 are perspective view of the terminal assemblies of the battery and connectors, according to the invention.

DETAILED DESCRIPTION

Figure 1:
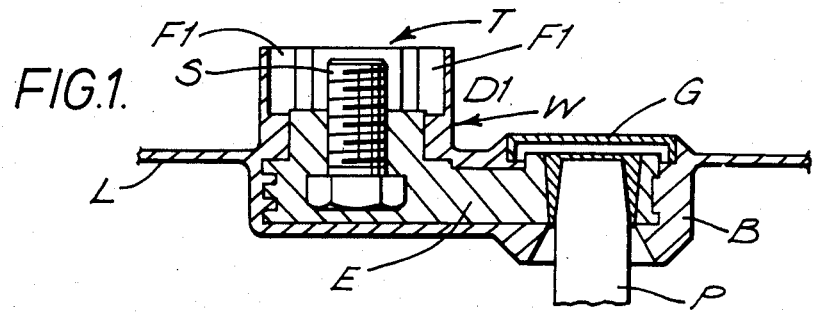
FIG. 1 is a sectional view of a terminal assembly of a battery according to the invention.

FIG. 1 shows part of the lid L of a battery as described, the lid L being formed with a bush B which receives an end portion of an electrode post P extending from an end cell of the battery. The other end of the bush B is closed by a removable cover G which serves to protect the post P, and which can be removed for testing of the battery.

The post P is electrically connected by a cast lead linking member E formed in a recess in the lid L, to a stainless steel stud S such as to leave a threaded end portion of the stud S extending above the outer surface of the lid L. As shown, the bush B and the recess in the lid L are formed with a keyed peripheral wall in order to retain the linking member E therein.

The terminal T has a wall W, integral with the lid L, formed about the upstanding end portion of the stud S, with sufficient clearance to receive a socket spanner used to tighten a threaded nut N onto the stud S to secure a connector thereto.

The battery may have a second terminal assembly similar to that described above.

Although the terminal assembly above has an externally threaded stud to receive a nut to secure a connector thereto, it can otherwise be an internally threaded hole therein to receive a screw or the like to secure a connector thereto.

Figure 2:
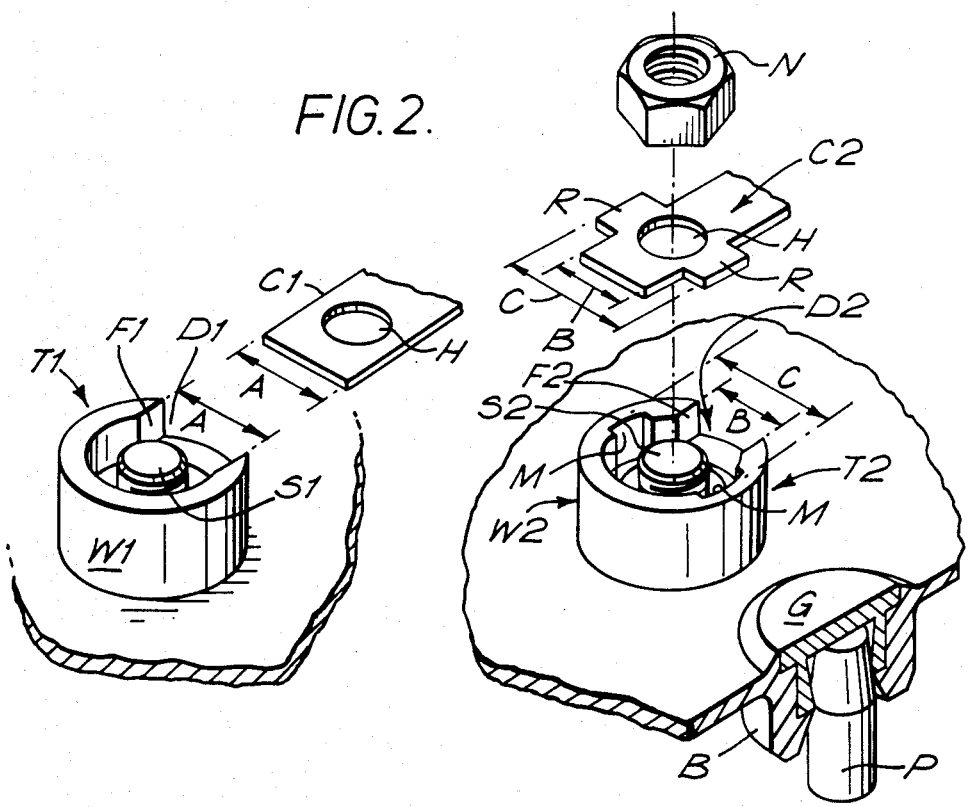

Referring now to FIGS. 2 and 3, which show two terminal assemblies T1 and T2 as shown in FIG. 1 carried by the lid L of a battery as described. Parts shown in FIGS. 2 corresponding to parts shown in FIG. 1 have the same reference character with the addition of a suffic number. In the battery shown the terminal T1 constitutes a negative and the terminal T2 constitutes a positive terminal.

A connector C1 for connection to the stud S1 of the negative terminal assembly T1 comprises a generally flat lug body, rectangular as seen in plan and having a width A. A connector C2 for connection to the stud S2 of the positive terminal T2 comprises a generally flat lug body which is cruciform in plan. The width B of the positive connector C2 is less than the width A of the negative connector C1, whereas the width C across the side extensions R of the cruciform is greater than width A. Each connector C1 or C2 has a hole H to receive the stud of the respective terminal T1 or T2.

The wall W1 formed about the negative terminal T1 is a circular sleeve having a cut out slot extending therethrough and having a side open to the free edge of the wall W1, defining a radial passageway D1. The facing ends F1 of the wall W1 defining the passageway D1 are flat, and are separated by a distance equal to width A.

The wall W2 located about the positive terminal T2 is also a circular sleeve having a similar cut out slot defining a radial passageway D2. The facing ends F2 of the wall W2 defining the passageway D2 are flat, and are separated by a distance equal to the width B. A middle portion M of the wall W2 has two recesses dimensioned and shaped to receive the side extension R of the positive connector C2, the bottom walls of the recess being separated by a distance equal to width C. Each wall W1 or W2 may be moulded integrally with the battery lid L, or glued or welded thereon, or otherwise it may be latched to the underlying link member E (see FIG. 1).

In use, connector C1 is tightly received in the passageway D1 in the wall W1, and a hexagonal nut N is threaded on to the stud S1. The other connector C2 is received in the passageway D2 with the side extension complementing the middle portion M of the wall W2. Each assembly may be covered by a cap or shroud of insulating material.

With the arrangement described above it is not possible to mismatch the connectors C1, C2 and the studs S1, S2 since the width of the passageway D2 of the wall W2 prevents the negative connector C2 from being received therein, while the width and shape of the passageway D1 of the wall W1 prevents the positive connector C2 from being received therein. The walls W1 and W2 thus provide a means inhibiting the making of wrong connections. The walls W1 and W2, as can be seen in FIG. 2, stand a short distance above the studs S1 or S2. As a result, if a metal object e.g. a spanner, is dropped onto the batery it is unlikely to make electrical contact with both the studs S1 and S2 i.e. to short circuit the two terminals T1 and T2.

Although in the embodiment described above one connector body is rectangular and the other is cruciform as seen in plan view, they can otherwise be of other shapes: for example the positive connector may otherwise be generally Y, P or S shaped, while either connector may include non-planar parts.

Further, although in the embodiment described above the terminal assemblies are provided on top of the battery lid, they can otherwise be provided on a generally vertical wall of the battery box or lid. It follows from this that even when provided in the lid the terminal assemblies can have their axes horizontal rather than vertical as in the embodiment described, the terminals then being connected to the electrode posts of the battery by way of appropriately shaped, for example L-shaped, linking members.

I claim:

1. An electric storage battery comprising a casing having a pair of terminals extending therefrom for connection to respective connectors, the terminals each having a free end and being located on a wall of the battery and spaced apart, each terminal being surrounded by an insulating wall, one of the connectors being shaped and dimensioned differently from the other, each of the connectors including an aperture for surrounding its respective terminal, each insulating wall having an aperture extending therethrough and leading to a respective passageway within the wall, each passageway being shaped to receive the respective connector only, the wall extending beyond the free end of the respective terminal to prevent an element e.g. a tool, bridging the terminals.

2. An electric storage battery according to claim 1, wherein said insulating walls are cylindrical.

3. An electric storage battery according to claim 1, wherein one of said connectors has two side extensions and wherein one of said walls has two radial recesses for receiving said respective side extensions.

4. A battery as claimed in claim 1, wherein the said wall is formed integrally with the casing.

5. A battery as claimed in claim 1, wherein the said wall is a separately formed member secured to the casing.

6. A battery as claimed in claim 1, wherein the said walls define mutually different width passageways to receive and engage the opposite sides of connectors for the said terminals and the said connectors comprise mutually different width bodies.

7. A battery as claimed in claim 6, wherein the said walls are shaped such that a connector for connection to one of the terminals cannot be connected to the other terminal, and a connector for connection to the other terminal cannot be connected to the said one terminal.

8. A battery as claimed in claim 7, wherein each said wall is formed with a radial aperture extending therethrough and having a side open to the free edge of the said wall, the apertures being of mutually different width, the narrower width aperture opening into a space defined by the associated wall having a dimension transverse to the axis of the aperture greater than the width of the wider aperture.

9. A battery according to claim 1, wherein the said terminals and the said walls therefor are mounted on the top or the side of the lid of the casing.

10. A battery according to claim 1, the battery comprising a box containing a pair of electrode posts, the said terminals being connected to the electrode posts respectively and accesible from outside the box, wherein each terminal is spaced from its associated electrode post laterally of the axis of the post by an electrically conductive linking member.

11. A battery as claimed in claim 10 wherein the said linking member is formed in a recess in the box.

12. A battery as claimed in claim 10, wherein the said linking member is a cast lead alloy.

13. A battery as claimed in claim 10, wherein each electrode post is covered by a removable cover removal of which renders the electrode post accessible from outside the box.

14. An electric storage battery, said battery comprising a casing having a plurality of compartments each containing a cell assembly of plates and separators, and a lid closing said casing, each cell assembly being electrically connected to its neighboring cell assemblies, each end cell being connected to a respective electrode post, an electrically conductive linking member extending between each post and a terminal therefor, said terminal being present on the exterior of said casing, connectors being provided for connection to the said terminals, the improvement comprising: each connector having an aperture surrounding its respective terminal and an insulating wall surrounding each of said terminals, the said wall being shaped so that only one of the connectors can be connected to each of the said terminals, wherein each said insulating wall is formed with a radial aperture extending therethrough, the aperture of one of said walls being wider than the aperture of the other of said walls, and the connectors for the terminals being of correspondingly different widths.

15. An automobile battery comprising: a casing having a pair of terminals extending therefrom, the terminals each having a free end and being located on a wall of the battery and spaced apart, differently shaped connectors being fitted to respective terminals and engaged therewith, each of said connectors having an aperture for surrounding a respective terminal, each terminal being further surrounded by an insulating wall, each insulating wall having an aperture extending therethrough and leading to a respective passageway within the wall, each passageway being shaped to receive the respective connector only, the wall extending beyond the free end of the respective terminal to prevent an element, e.g. a tool, bridging the terminals.

16. A battery as claimed in claim 15, wherein the said walls define mutually different width passageways to receive and engage the opposite sides of connectors for the said terminals and the said connectors comprise mutually different width bodies.

17. A battery as claimed in 16, wherein the said walls are shaped such that a connector for connection to one of the terminals cannot be connected to the other terminal, and a connector for the other terminal cannot be connected to the said one terminal.

18. A battery as claimed in claim 17, wherein each said wall is formed with a radial aperture extending therethrough and having a side open to the free edge of the said wall, the apertures being of mutually different width, the narrower width aperture opening into a space defined by the associated wall having a dimension transverse to the axis of the aperture greater than the width of the wider aperture.

19. A battery according to claim 15, the battery comprising a box containing a pair of electrode posts, the said terminals being connected to the electrode posts respectively and accessible from outside the box, wherein each terminal is spaced from its associated electrode post laterally of the axis of the post by an electrically conductive linking member.

20. An electric storage battery according to claim 15, wherein said insulating walls are cylindrical.

21. An electric storage battery according to claim 15, wherein one of said connectors has two side extensions and wherein one of said walls has two radial recesses for receiving said respective side extensions.

22. A battery as claimed in claim 19, wherein each electrode post is covered by a removable cover removal of which renders the electrode post accessible from outside the box.

* * * * *